United States Patent [19]

Asberg et al.

[11] Patent Number: 4,755,067
[45] Date of Patent: Jul. 5, 1988

[54] SEAL FOR SPHERICAL ROLLING BEARINGS

[75] Inventors: Sture Asberg, Vastra Frolunda; Matts Floderus, Goteborg; Gunnar Grafstrom, Floda; Olle Andersson, Molndal, all of Sweden

[73] Assignee: SKF Nova, Goteborg, Sweden

[21] Appl. No.: 20,505

[22] Filed: Mar. 3, 1987

[30] Foreign Application Priority Data

Mar. 25, 1986 [SE] Sweden .................................. 8601374

[51] Int. Cl.$^4$ ........................ F16C 25/08; F16C 33/78
[52] U.S. Cl. .................................... 384/482; 384/558; 277/95
[58] Field of Search ........................ 384/482, 140, 558; 277/95, 37, 38

[56] References Cited

U.S. PATENT DOCUMENTS

| | | | |
|---|---|---|---|
| 3,457,732 | 7/1969 | Decouzon | 277/95 |
| 3,656,824 | 4/1972 | Ullberg | 384/442 |
| 4,643,594 | 2/1987 | Neder et al. | 277/95 |

Primary Examiner—Lenard A. Footland
Attorney, Agent, or Firm—Eugene E. Renz, Jr.

[57] ABSTRACT

The invention refers to a seal for self-aligning spherical rolling bearings. It is characterized therein that it incorporates two cooperating annular and mainly radially directed plates affixed to one ring each. One of the plates is equipped with at least one annular sealing lip, which exerts a mainly axial pressure against the second plate.

2 Claims, 2 Drawing Sheets ional loi4,755,067

SEAL FOR SPHERICAL ROLLING BEARINGS

FIELD OF THE INVENTION

The present invention refers to seals for self-aligning spherical rolling bearings.

BACKGROUND OF THE INVENTION

The spherical rolling bearings generally have two rows of rollers with a common spherical raceway in the outer race ring. On the inner race ring each roller row has its own raceway, which is inclined at an angle relative to the bearing axis. The inner race ring and the rollers can align themselves freely to different positions in the outer race ring. The bearings thereby have a self-aligning ability and allow a misalignment of shaft in relation to housing, which misalignment originates from a direction deviation at mounting or due to deflection of the shaft. The permitted misalignment is in the order of $\pm 1°-2°$.

A sliding seal shall be able to take up twice the size of the misalignment at its circumference, which makes it difficult in a simple manner to secure a good sealing function. It is, therefore, unusual with built-in seals in such bearings.

Some bearings, however, have been equipped with seals such as so-called "radial seals" which exert a radial pressure against the surface on which the seal acts. On one hand, radial seals of conventional type, i.e. with one or more lips which radially abut a cylindrical surface on the inner race ring have been used. At a small misalignment such a seal produces excessively high friction at the portion which is radially compressed and a too inferior sealing effect at the opposite, elevated side. On the other hand, attempts also have been made with built-in radial seals with spherical design. An example of such a seal is shown in Swedish Patent No. 47555. A seal of this type provides an even friction independent of the size of the misalignment, but it has not been considered practical, due to complicated design, large axial space requirements and high sensitivity to mechanical damage during handling. It, therefore, long has been a desire to be able to provide a seal for spherical rolling bearings, which is integrated in the bearing, which provides a good sealing effect at low friction, which is not space requiring and which seals effectively independent of the misalignment of the bearing.

SUMMARY OF THE INVENTION

The above desires have been satisfied by a seal in accordance with the present invention for self-aligning spherical rolling bearings incorporating outer race ring, inner race ring and rolling bodies interposed therebetween. The seal is characterized by novel features of construction and arrangement including cooperating annular, mainly radially directed plates fixedly attached on one race ring each. The radially outer plate is slightly bent axially inwardly towards the bearing, whereas the radially inner plate is equipped with at least one annular sealing lip exerting a mainly axial pressure against the outer side of the part of the outer plate, which is bent axially slightly inwardly.

It is important that the radial extension of the sealing lip is of a large enough size so that misalignment of the bearing, which causes the plates to be axially displaced relative to each other, will not lead to an impaired sealing ability.

It is suitable that the sealing lip or lips are arranged on the radially inner plate and that they abut the outer side of the radially outer plate. Hereby it is possible to relubricate the bearing, as excess grease in the bearing then can be pressed out.

An important feature of the device according to the invention is that the sealing lip or lips engage the cooperating plate radially outside the bearing cage. This is in itself an unfavourable location to arrange the contact between sealing lip and cooperating plate, since the deflection at misalignment of the bearing is greater there than closer to the inner race ring. This can be achieved anyhow, as the sealing lip has been made very long.

According to the invention it is appropriate that the portion of the radially outer plate, which projects inwardly, is bent somewhat axially inwardly towards the bearing from an axially outwardly bent web portion. Two desirable functions are achieved in this manner. First, a grease space is defined or formed at the bend of the plate. Second, the rolling bodies radially outside the cage will contact the inner edge of the plate, at relatively large misalignment of the bearing, which plate edge resiliently will prevent further misalignment. Such a case will hardly occur under operation but can occur prior to the bearing being mounted.

According to the invention, the radially outer plate is affixed to the outer race ring by being pressed in and the radially outer edge of the plate being deformed into a groove in the side plane of the outer race ring. Thus, a space is provided radially outside the seal for attachment of the bearing in a common manner. The plate also can be affixed in another manner, e.g. be snapped into a groove in the envelope surface of the outer race ring. This applies particularly for small bearings.

In order to prevent the bearing at handling the inner plate according to the invention is equipped with an axially projecting shoulder adjacent the attachment at the inner race ring, which shoulder forms a mechanical supporting face.

BRIEF DESCRIPTION OF THE DRAWINGS

Hereinafter, the invention will be further described with reference to the drawings, in which.

DETAILED DESCRIPTION OF THE PREFERRED EMBODIMENT

Figure 1:
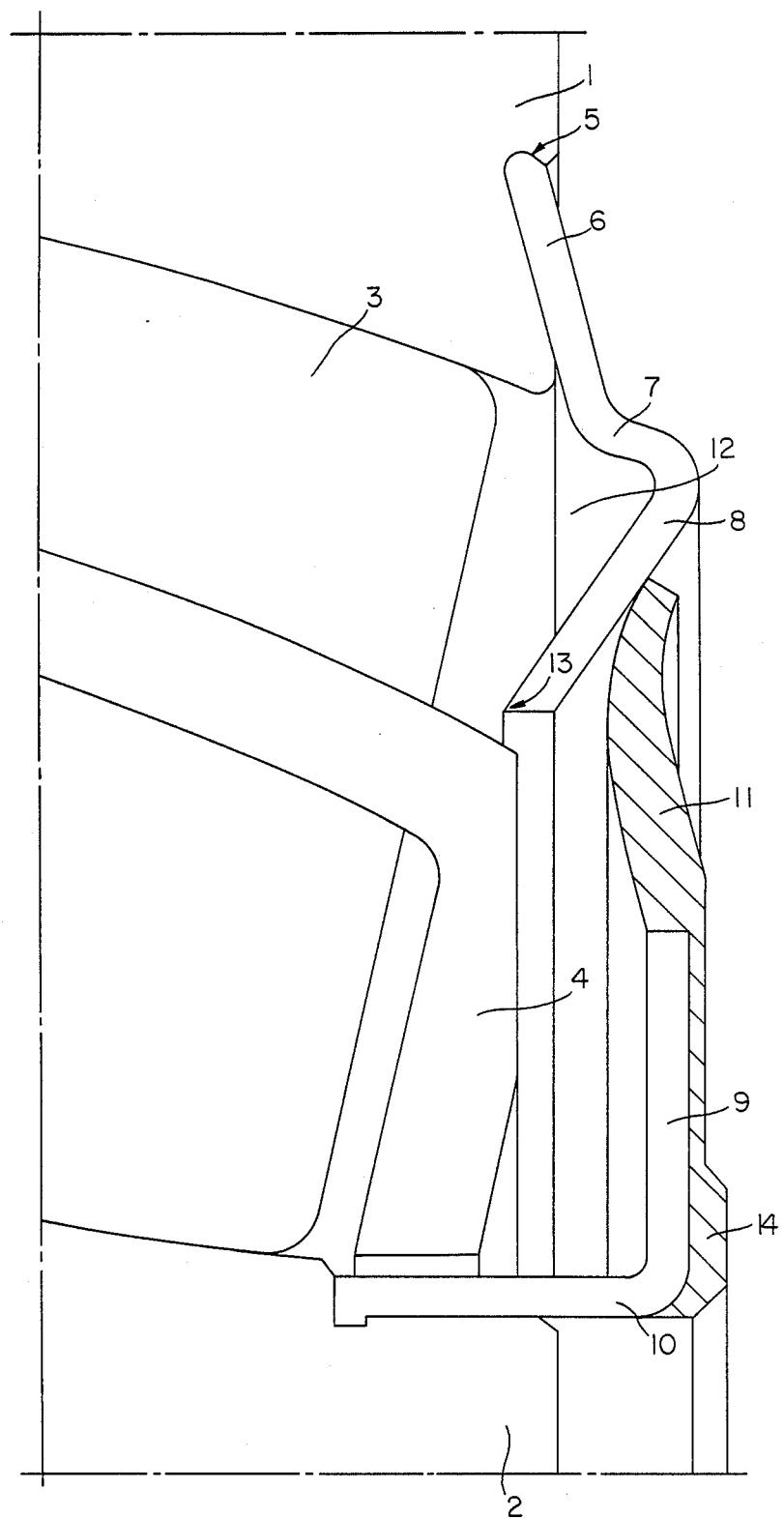
FIG. 1 shows in a radial cross-section, a preferred embodiment according to the invention.

FIG. 1 shows a section of a spherical roller bearing having an outer race ring 1, an inner race ring 2 and, interposed therebetween, rolling bodies 3 with a cage 4. In a groove 5 on the outer race ring, is affixed a sealing plate 6 with a web portion 7 and an axially inner portion 8 which, from the web portion 7, projects obliquely inwardly towards the centre of the bearing. Upon the inner race ring 2 is attached a plate 9, which, in the present case, has a flange 10, which has been snapped onto the inner race ring 2. A long rubber lip 11 is bonded on the plate 9 which lip 11 abuts the inner portion 8 of the outer plate 6.

Due to the bulging of the outer plate 6 with axial force, a grease space 12 is formed or defined. As can be seen in the figure, the edge 13 of the inner portion 8 extends towards the rolling bodies 3 radially outside the cage 4. If, therefore, the bearing, especially during handling prior to mounting, should take up a very large misalignment, this will be resiliently stopped by this edge 13. In order to protect the bearing further, there is provided a shoulder 14 in the rubber lip 11 at the radially inner edge of the plate 9. Due to this shoulder, the bearing is protected axially during handling, and it can be placed upon a reasonably plain base without any other part than the shoulder 14 and the outer part of the outer plate at the same time contracting the base.

Figure 2:
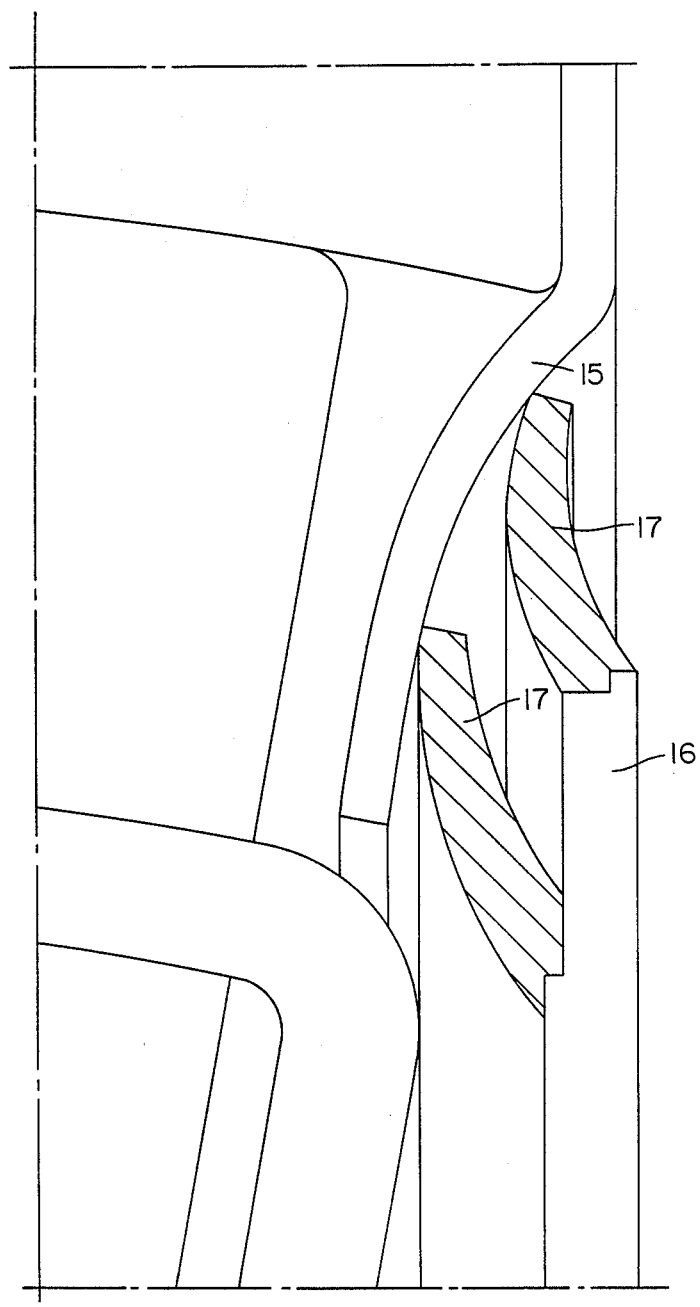
FIG. 2 shows an alternative embodiment of the seal according to FIG. 1.

In FIG. 2, the inner portion 15 of the outer plate has been given a slightly bent shape, and two lips 17 have been provided upon the inner plate 16.

As can be seen from the figures, it is also possible to relubricate bearings having these modifications as the lips open for pressure from the inside.

In the figures are shown only bearings having standard measures. As can be seen, particularly from FIG. 1, there is space radially outside and inside the seals for attachment of the standard bearing without any measure alterations having to be done. As can be seen, the seals project a very short distance axially outside the bearing. This means that the bearing with its integrated seals also can be used in locations where it is intended to use bearings of standard size without seals.

At the bearings, according to FIGS. 1 and 2, the lips will operate also as flingers and they will have low friction at high speeds.

The invention is not limited to the embodiments shown but can be varied in different manners within the scope of the claims.

What is claimed is:

1. A seal for self-aligning spherical rolling bearings incorporating outer race ring (1), inner race ring (2) and rolling bodies (3) interposed therebetween, characterized therein, that it incorporates cooperating, annular, mainly radially directed outer and inner plates (6, 9, 15, 16) fixedly attached to the outer and inner race rings (1, 2) respectively, the radially outer plate (6, 15) having a slightly bent axially inwardly directed portion (8, 15a), said inner plate (9, 16) having at least one annual sealing lip (11, 17) directed to exert a mainly axial pressure against an outer face of said inwardly directed portion (8, 15a), the radially inner edge (13) of the radially outer plate (6), at large misalignment of the bearing, contacting the rolling bodies (3) radially outside the cage (4) and resiliently prevents further misalignment.

2. A seal for self-aligning spherical rolling bearings incorporating outer race ring (1), inner race ring (2) and rolling bodies (3) interposed therebetween, characterized therein, that it incorporates cooperating, annular, mainly radially directed outer and inner plates (6, 9, 15, 16) fixedly attached to the outer and inner race rings (1, 2) respectively, the radially outer plate (6, 15) having a slightly bent axially inwardly directed portion (8, 15a), said inner plate (9, 16) having at least one annular sealing lip (11, 17) directed to exert a mainly axial pressure against an outer face of said inwardly directed portion (8, 15a), the radially outer plate (6) being affixed to the outer race ring (1) by being pressed in and the radially outer edge of the plate being deformed in a goove (5) in the side plane of the outer race ring (1).

* * * * *